(12) United States Patent
Back

(10) Patent No.: US 8,301,151 B2
(45) Date of Patent: Oct. 30, 2012

(54) NETWORK CONTROLLER AND SMALL BASE STATION

(75) Inventor: Chang Hyun Back, Seoul (KR)

(73) Assignee: Pantech Co., Ltd., Seoul (KR)

( * ) Notice: Subject to any disclaimer, the term of this patent is extended or adjusted under 35 U.S.C. 154(b) by 56 days.

(21) Appl. No.: 12/832,665

(22) Filed: Jul. 8, 2010

(65) Prior Publication Data

US 2011/0092215 A1    Apr. 21, 2011

(30) Foreign Application Priority Data

Oct. 16, 2009    (KR) .................. 10-2009-0098752

(51) Int. Cl.
*H04W 36/00* (2009.01)

(52) U.S. Cl. ...................... 455/444; 455/436

(58) Field of Classification Search .......... 455/436–439, 455/443, 444, 447, 450, 422.1, 507, 519, 455/556.5, 561, 56; 370/331, 332
See application file for complete search history.

(56) References Cited

U.S. PATENT DOCUMENTS

| | | | | |
|---|---|---|---|---|
| 5,513,380 | A * | 4/1996 | Ivanov et al. .................. | 455/441 |
| 7,145,890 | B1 * | 12/2006 | Seo et al. ....................... | 370/331 |
| 2003/0129985 | A1 * | 7/2003 | Naden et al. .................... | 455/447 |
| 2004/0202135 | A1 * | 10/2004 | Han et al. ...................... | 370/332 |
| 2005/0130662 | A1 * | 6/2005 | Murai ............................ | 455/444 |
| 2008/0069028 | A1 * | 3/2008 | Richardson .................... | 370/328 |
| 2008/0085699 | A1 * | 4/2008 | Hirano et al. ............... | 455/414.2 |
| 2009/0005046 | A1 * | 1/2009 | Won et al. ..................... | 455/436 |
| 2009/0252073 | A1 | 10/2009 | Kim et al. | |
| 2009/0285143 | A1 * | 11/2009 | Kwun et al. ................... | 370/311 |
| 2010/0056184 | A1 * | 3/2010 | Vakil et al. ................. | 455/456.5 |
| 2010/0151858 | A1 * | 6/2010 | Brisebois et al. ............. | 455/434 |
| 2011/0053604 | A1 * | 3/2011 | Kim et al. ..................... | 455/450 |
| 2011/0092234 | A1 * | 4/2011 | Kim et al. ..................... | 455/507 |

FOREIGN PATENT DOCUMENTS

| | | |
|---|---|---|
| EP | 2 056 628 A1 | 5/2009 |
| EP | 2 107 840 A2 | 10/2009 |
| KR | 1020060135460 | 12/2006 |
| KR | 1020090105877 | 10/2009 |
| WO | 2008131588 | 11/2008 |
| WO | 2009095779 | 8/2009 |
| WO | 2010027569 | 3/2010 |

OTHER PUBLICATIONS

European Search Report dated Jan. 18, 2011.
European Search Report dated Jan. 20, 2011.
Huawei, hNB Interference Reduction, 3GPP TSG, vol. RAN2 #60bis, Jan. 14-18, 2008, Seville, Spain. Mitsubishi Electric, Dynamic Setup of HNBs for Energy Savings and Interference Reduction, 3GPP TSG, vol. RAN WG3, Meeting #61, Aug. 18-22, 2008, Jeju Island, Korea.
Motorola, Guang Han, Anand Bedekar, Rajeev Agrawal, A method to support femto-macro handover with minimal interference to the macro network; IP.COM Journal, Oct. 16, 2008, West Henrietta, New York, USA.
Non-Final Office Action dated Dec. 6, 2011 in U.S. Appl. No. 12/832,621.

* cited by examiner

*Primary Examiner* — Cong Tran
(74) *Attorney, Agent, or Firm* — H.C. Park & Associates, PLC

(57) ABSTRACT

A small base station may report to a network controller about whether a radio frequency (RF) signal transmitted from a macro base station is sensed. The network controller may control an operational mode of the small base station depending on whether the RF signal is sensed. Accordingly, the small base station may not transmit the RF signal at all times, and thus, it is possible to reduce an interference between a small cell and a macro cell or interference between the small cell and another small cell.

17 Claims, 8 Drawing Sheets

NETWORK CONTROLLER AND SMALL BASE STATION

CROSS-REFERENCE TO RELATED APPLICATION

This application claims priority from and the benefit of Korean Patent Application No. 10-2009-0098752, filed on Oct. 16, 2009, which is hereby incorporated by reference for all purposes as if fully set forth herein.

BACKGROUND

1. Field

Exemplary embodiments of the present invention relate to a network controller and a small base station.

2. Discussion of the Background

A small cell technology may provide a communication service in a relatively small coverage compared to a coverage managed by a macro base station of a macro cell. The small cell technology has been developed to increase coverage for a mobile terminal indoors, however, the small cell technology may additionally provide various types of wired or wireless services at inexpensive costs using the Internet and the mobile terminal.

Generally, a plurality of small base stations may be provided within a single macro cell area. A number of small cells corresponding to a number of small base stations may be formed. A terminal located within coverage of a small cell may use a mobile communication service via a corresponding small base station.

However, if the small cell uses the same frequency band as the macro cell, the small cell may continuously transmit a communication signal, such as a radio frequency (RF) signal, which may cause interference with the macro cell, thereby deteriorating the performance of the macro cell.

SUMMARY

Exemplary embodiments of the present invention provide a small base station and a network controller of controlling a mode of the small base station that may reduce interference between a small cell and a macro cell.

Additional features of the invention will be set forth in the description which follows, and in part will be apparent from the description, or may be learned by practice of the invention.

An exemplary embodiment provides a network controller including a network communication unit to communicate with a macro base station of a macro cell and a small base station of a small cell, and a network control unit to control the small base station to be booted up in an idle mode if the small cell is located within a coverage of the macro cell, and to be booted up in an active mode if the small cell is located outside the coverage of the macro cell.

An exemplary embodiment provides a small base station including a small base station communication unit to communicate with a macro base station and a network controller; and a small base station control unit to control the small base station communication unit to report to the network controller that the a communication signal transmitted from the macro base station is sensed if the small base station is powered on and the small base station communication unit senses the communication signal, and to control the small base station to operate in one of an idle mode and an active mode according to a command received from the network controller.

An exemplary embodiment provides a communication system, including: a macro base station corresponding to a macro cell; and a small base station corresponding to a small cell; and a network controller to determine a mode of the small base station according to a coverage of the small cell and a coverage of the macro cell.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
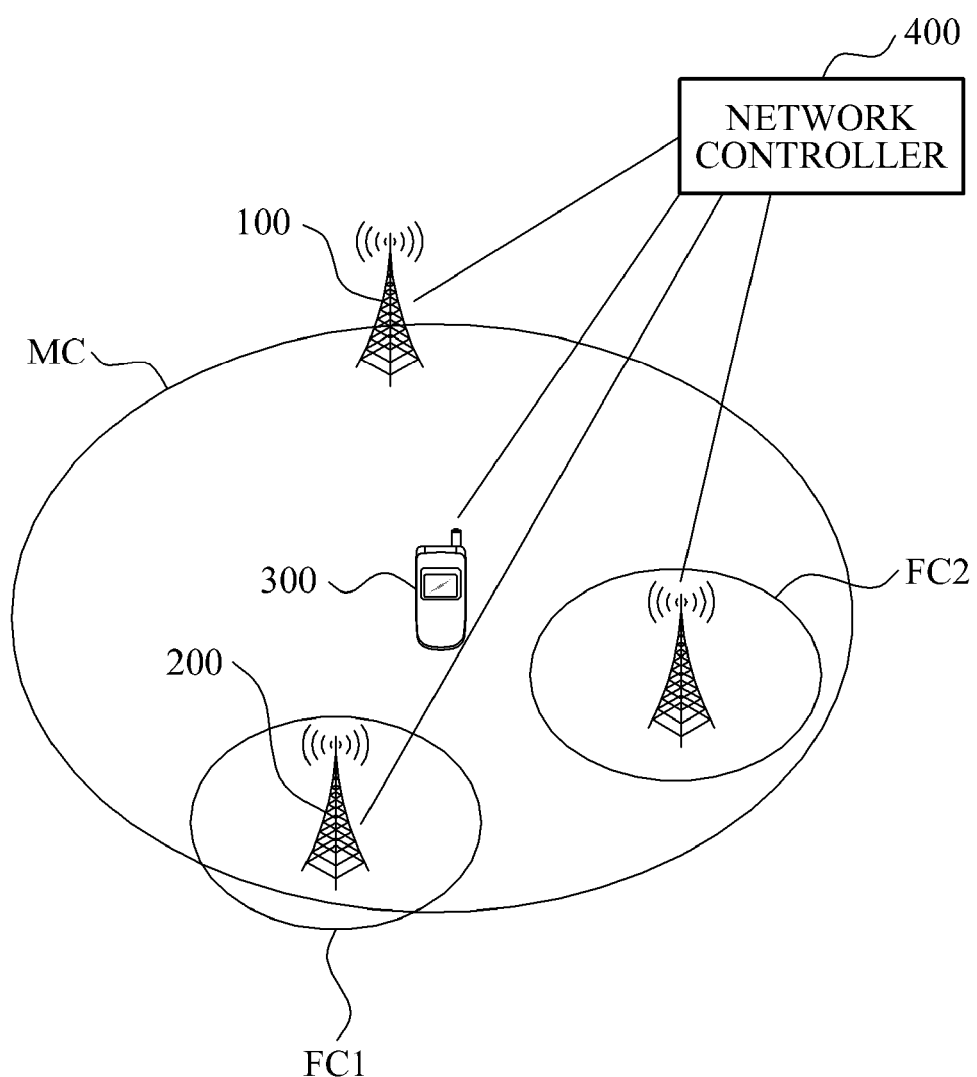
FIG. 1 is a diagram illustrating a communication system according to an exemplary embodiment of the present invention.

Aspects of the invention are described more fully hereinafter with reference to the accompanying drawings, in which exemplary embodiments of the invention are shown. Aspects of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

Also, terms are used herein to appropriately describe the exemplary embodiments of the present invention and thus may be changed depending on a user, the intent of an operator, or a custom.

FIG. 1 is a diagram illustrating a communication system according to an exemplary embodiment of the present invention. A macro cell MC may enable a macro base station 100 to communicate with a terminal 300 within the macro cell MC.

A small cell FC1 and a small cell FC2 may enable respective small base stations to communicate with the terminal 300 located within or outside coverages of the small cell FC1 and the small cell FC2. A plurality of base stations may be installed within or outside the coverage of the macro cell MC, and may have coverage of small cells, for example, the coverage of the small cell FC1 and the coverage of the small cell FC2.

For example, a small base station 200 may correspond to a femto base station. The small cells FC1 and FC2 may include a femto cell, a pico cell, a home node B, a home EnB, and the like. Hereinafter, descriptions will be made based on the small cell FC1.

If the small base station 200 is powered on and does not sense a communication signal transmitted from the macro base station 100, the small base station 200 may be booted up in an active mode according to control of a network controller 400. Conversely, if the small base station 200 senses the communication signal transmitted from the macro base station 100, the small base station 200 may be booted up in an idle mode according to control of the network controller 400.

A user equipment device capable of performing wired or wireless communication, for example, a mobile phone, a laptop, a personal computer (PC), a portable multimedia player (PMP), and the like may be employed as the terminal 300.

The network controller 400 may correspond to a gateway or a core network device communicating with the macro base station 100, the small base station 200, and the terminal 300 via a gateway. The network controller 400 may control and manage an operation of the small cell FC1 or an operation of the small base station 200. For example, if the small base station 200 performs network entry, the network controller 400 may function as a self-organization management server. If data, page, and the like is received from the terminal 300, or if a service transmission request is received from the terminal 300, the network controller 400 may power on the small base station 200 of the small cell FC1 within the coverage of the macro cell MC and/or switch the small base station 200 from the idle mode to the active mode. Further, the network controller 400 may enable the terminal 300 to receive a service from the small base station 200.

Figure 2:
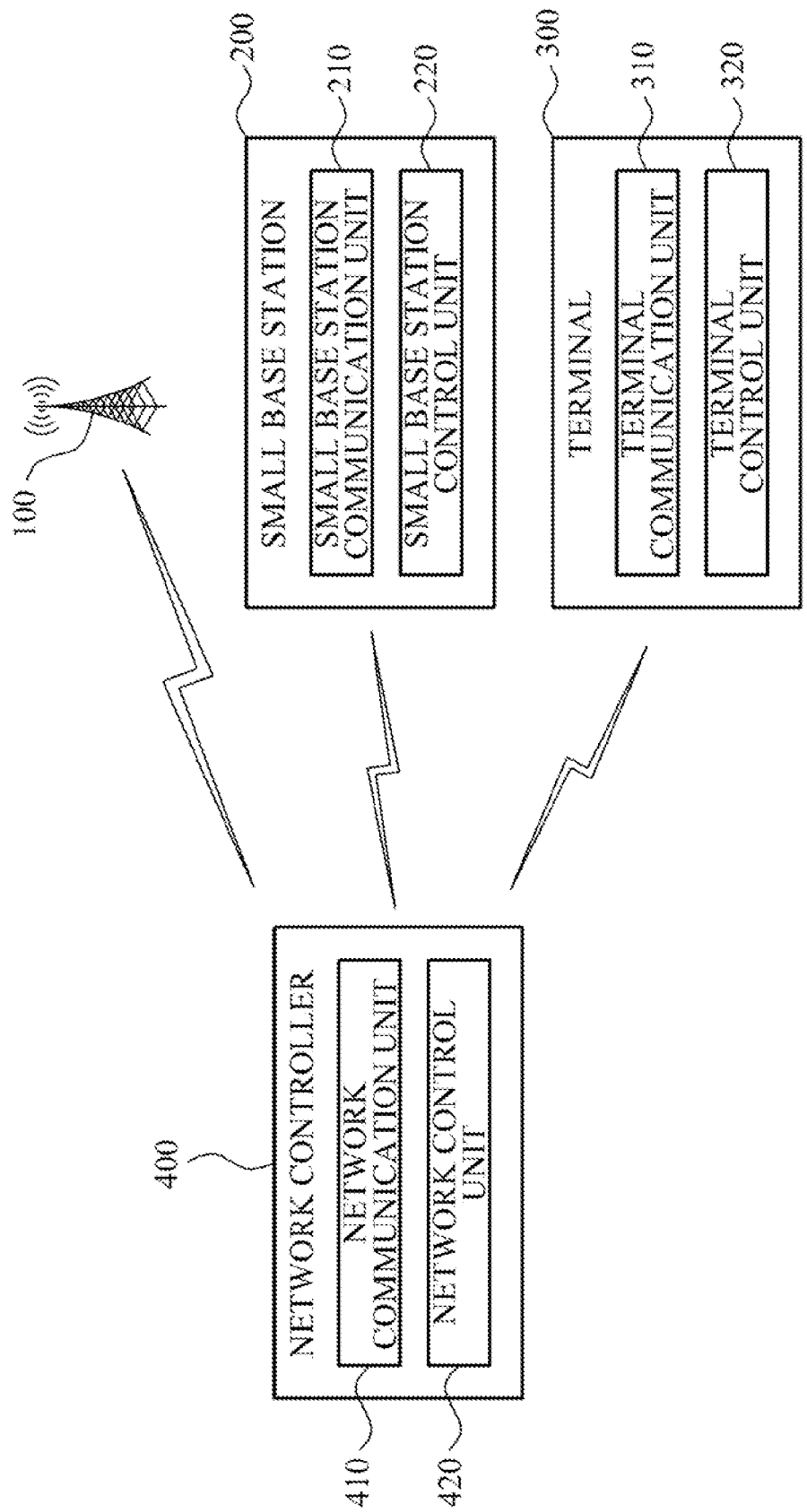
FIG. 2 is a block diagram illustrating a small base station, a terminal, and a network controller of FIG. 1.

FIG. 2 is a block diagram illustrating the small base station 200, the terminal 300, and the network controller 400 of FIG. 1. The small base station 200 may include a small base station communication unit 210 and a small base station control unit 220. The small base station communication unit 210 may communicated wirelessly or through wires with the macro base station 100, the terminal 300, and the network controller 400.

If the small base station 200 is powered on, the small base station control unit 220 may control the small base station communication unit 210 to transmit a configuration request to the network controller 400. In response to the configuration request, the small base station control unit 220 may receive data from the network controller 400 to perform an initialization process. The configuration request may request data used for self-organization, and thus may request information used for the small base station 200 to provide a communication function, for example, information used to set a frequency band.

While the small base station control unit 220 receives the data from the network controller 400 during the initialization process, the small base station control unit 220 may control the small base station communication unit 210 to report to the network controller 400 about whether a communication signal transmitted from the macro base station 100 is sensed. The communication signal transmitted from the macro base station 100 may be a radio frequency (RF) signal. The RF signal may be sensed via an antenna or a separate and/or different sensor.

According to a command received from the network controller 400, the small base station control unit 220 may control the small base station 200 to operate in one of an idle mode and an active mode. The small base station 200 may not provide a service in the idle mode, and the small base station 200 may provide the service in the active mode.

Specifically, if the small cell FC 1 is located within the coverage of the macro cell MC, the small base station 200 may be booted up in the idle mode according to control of the network controller 400. Conversely, if the small cell FC1 is not located within the coverage of the macro cell MC, the small base station 200 may be booted up in the active mode.

In the idle mode, because the small base station 200 does not transmit a broadcasting message containing a use frequency band, location information, and an identification (ID) of the small base station 200, or a signal used for communication with the terminal 300, the service may not be provided. If the small base station 200 is booted up and operates in the idle mode, the small base station 200 may not transmit a communication signal such as an RF signal and thus may reduce interference with the macro cell MC.

If a command to switch from the idle mode to the active mode is received from the network controller 400 while the small base station 200 is booted up and is operating in the idle mode, the small base station control unit 220 may control the small base station 200 to be switched from the idle mode to the active mode to so that the small base station 200 may provide the service. Switching to the active mode may be determined by the network controller 400. For example, if the terminal 300 requests the network controller 400 for the service, the small base station 200 may be switched to the active mode according to control of the network controller 400 and then provide the terminal 300 with the service.

If the service is terminated, the small base station control unit 220 may maintain the active mode until an idle mode switching command is received from the network controller 400. If the idle mode switching command is received from the network controller 400, the small base station control unit 220 may control the small base station 200 to be switched from the active mode to the idle mode. The idle mode may also be referred to as a passive mode or a sleep mode.

In the active mode, the small base station 200 may operate in a same or similar manner to the macro base station 100. The terminal 300 may search the small cell FC1 or the small base station 200 through a signal search. If the small base station 200 corresponds to a registered terminal, a location update, i.e., camping on, may be allowed. The terminal 300 may make a service request using the small base station 200. If the terminal 300 is handed over to the macro cell MC, the macro base station 100 may provide the terminal 300 with the service. The small base station control unit 220 may switch the small base station 200 from the active mode to the idle mode according to an idle mode switching command received from the network controller 400.

The terminal 300 may include a terminal communication unit 310 and a terminal control unit 320. The terminal communication unit 310 may communicate wirelessly or through wires with the macro base station 100, the small base station 200, and the network controller 400.

If the terminal 300 is camped on within the coverage of the small cell FC1 in which the small base station 200 is in the active mode, the terminal control unit 320 may control the terminal communication unit 310 to communicate with the small base station 200, and to receive the service according to control of the network controller 400. If the terminal 300 is located within the coverage of the macro cell MC or within the coverage of the small cell FC1 in which the small base station 200 is in the idle mode, the terminal control unit 320 may control the terminal communication unit 310 to communicate with the macro base station 100, and to receive the service from the macro base station 100.

If the small base station 200 is switched from the idle mode to the active mode while the terminal 300 receives the service from the macro base station 100, the terminal control unit 320 may control the terminal 300 to handover to the small base station 200 according to control of the network controller 400. Accordingly, the terminal 300 may receive the service through communication with the small base station 200.

The network controller 400 may include a network communication unit 410 and a network control unit 420. The network communication unit 410 may communicate wirelessly or through wires with the macro base station 100, the small base station 200, and the terminal 300. If the small base station 200 is powered on and performs an initialization process, the network communication unit 410 may provide the small base station 200 with data with respect to a configuration request.

The network control unit 420 may manage and control an operational mode of the small base station 200 according to a signal received from the macro base station 100 or the small base station 200. According to whether the small cell FC1 is included within the coverage of the macro cell MC, the network control unit 420 may determine a communication mode of the small base station 200 to provide a communication related service.

Specifically, if the small cell FC1 is located within the coverage of the macro cell MC, the network control unit 420 may control the network communication unit 410 so that the small base station 200 may be booted up in the idle mode. If the small cell FC1 is located outside the coverage of the macro cell MC, the network control unit 420 may control the network controller 410 to transmit to the small base station 200 a command to boot up in the active mode.

The network control unit 420 may determine whether the small cell FC1 is located within the coverage of the macro cell MC according to at least the following processes.

If the network communication unit 410 receives from the small base station 200 a sensing signal indicating that the small base station 200 senses a communication signal transmitted from the macro base station 100, the network control unit 420 may determine that the small cell FC1 is located within the coverage of the macro cell MC.

If the small base station 200 is provided in a location connected to the Internet, the network control unit 420 may receive information associated with the location of the small base station 200 in interoperation with the Internet. The network controller 400 may be aware of the coverage of the macro cell MC. Accordingly, the network controller 400 may compare the location of the small base station 200 with the coverage of the macro cell MC to determine whether the small base station 200 is located within the coverage of the macro base station 100.

If a service request associated with the terminal 300 is received, the network control unit 420 may control one of the macro base station 100 and the small base station 200 to provide the service based on an operational mode of the small base station 200. Specifically, if the terminal 300 is camped on within the coverage of the small cell FC1, it may indicate that the terminal 300 requests a service using the small base station 200, and thus, the network control unit 420 may determine the small base station 200 is in the active mode. Accordingly, the network control unit 420 of the network controller 400 may control the small base station 200 to provide the service to the terminal 300.

If the terminal 300 or the small base station 200 reports that the service is terminated, the network control unit 420 may control the network communication unit 410 so that the small cell FC1 or the small base station 200 may receive a command to switch from the active mode to the idle mode.

The network control unit 420 may hand over the terminal 300 to the macro base station 100 before the service is terminated.

If a service request associated with the terminal 300 is received and the terminal 300 is not located within the coverage of the small cell FC1, the network control unit 420 may control the macro base station 100 to provide the service. While the macro base station 100 provides the service, the network control unit 420 may control the network communication unit 410 so that the small base station 200 may receive a command to switch from the idle mode to the active mode.

If the small cell base station 200 is switched from the idle mode to the active mode, the network control unit 420 may hand over the terminal 300 to the small base station 200 and control the small base station 200 to provide the terminal 300 with the service. If the service provided from the small base station 200 is terminated, the network control unit 420 may transmit to the small base station 200 a command to switch the small cell FC1 from the active mode to the idle mode.

If the small base station 200 is switched to the active mode and does not complete providing of the service, the network control unit 420 may hand over the terminal 300 to the macro base station 100.

Hereinafter, operations of the macro base station 100, the small base station 200, the terminal 300, and the network controller 400 will be described with reference to FIGS. 3 through 8.

Figure 3:
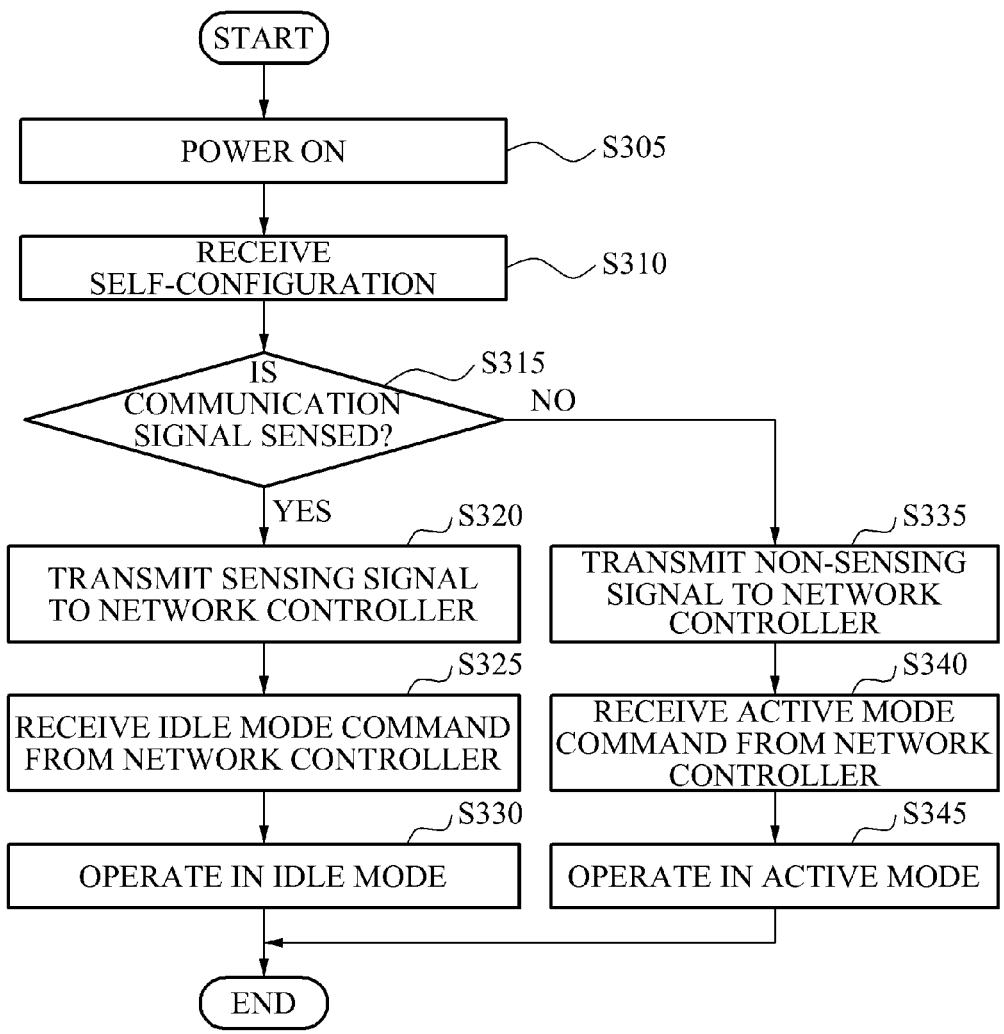
FIG. 3 is a flowchart illustrating a method for setting an operational mode of a small base station according to an exemplary embodiment of the present invention.

FIG. 3 is a flowchart illustrating a method for setting an operational mode of the small base station 200 according to an exemplary embodiment of the present invention. Referring to FIG. 3, if the small base station 200 is powered on in operation S305, the small base station control unit 220 may receive from the network controller 400 data used for self-configuration, and may perform an initialization process in operation S310.

If the small base station communication unit 210 senses a communication signal transmitted from the macro base station 100 in operation S315, the small base station communication unit 210 may transmit a sensing signal to the network controller 400 according to control of the small base station control unit 220 in operation S320.

If an idle mode command is received from the network controller 400 in operation S325, the small base station control unit 220 may control the small base station 200 to be booted up and operate in an idle mode in operation S330.

If the communication signal is not sensed in operation S315, the small base station communication unit 210 may transmit a non-sensing signal to the network controller 400 according to control of the small base station control unit 220 in operation S335.

If an active mode command is received from the network controller 400 in operation S340, the small base station control unit 220 may control the small base station 200 to operate in the active mode in operation S345.

Figure 4:
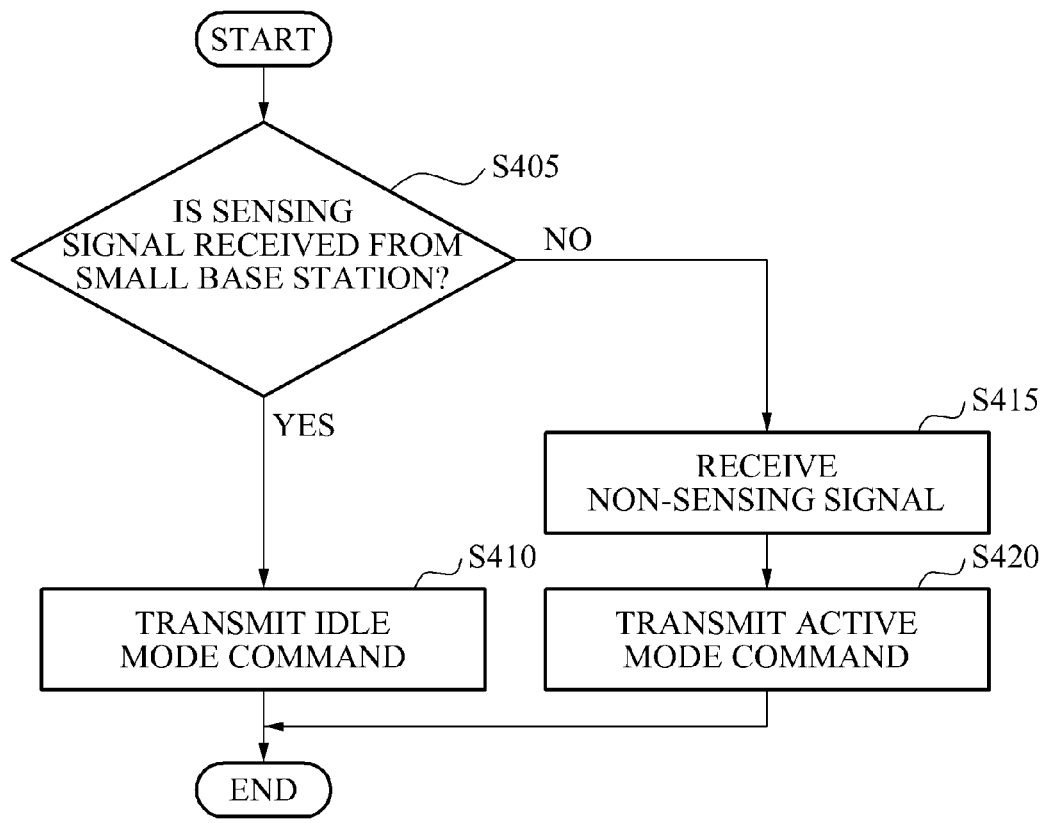
FIG. 4 is a flowchart illustrating a method for setting an operational mode of a small base station by a network controller according to an exemplary embodiment of the present invention.

FIG. 4 is a flowchart illustrating a method for setting an operational mode of the small base station 200 by the network controller 400 according to an exemplary embodiment of the present invention. Referring to FIG. 4, if the network communication unit 410 receives a sensing signal from the small base station 200 in operation S405, the network control unit 420 may control the network communication unit 410 to transmit an idle mode command to the small base station 200 in operation S410.

Conversely, if a non-sensing signal is received in operation S415, the network control unit 420 may control the network communication unit 410 to transmit an active mode command to the small base station 200 in operation S420.

Figure 5:
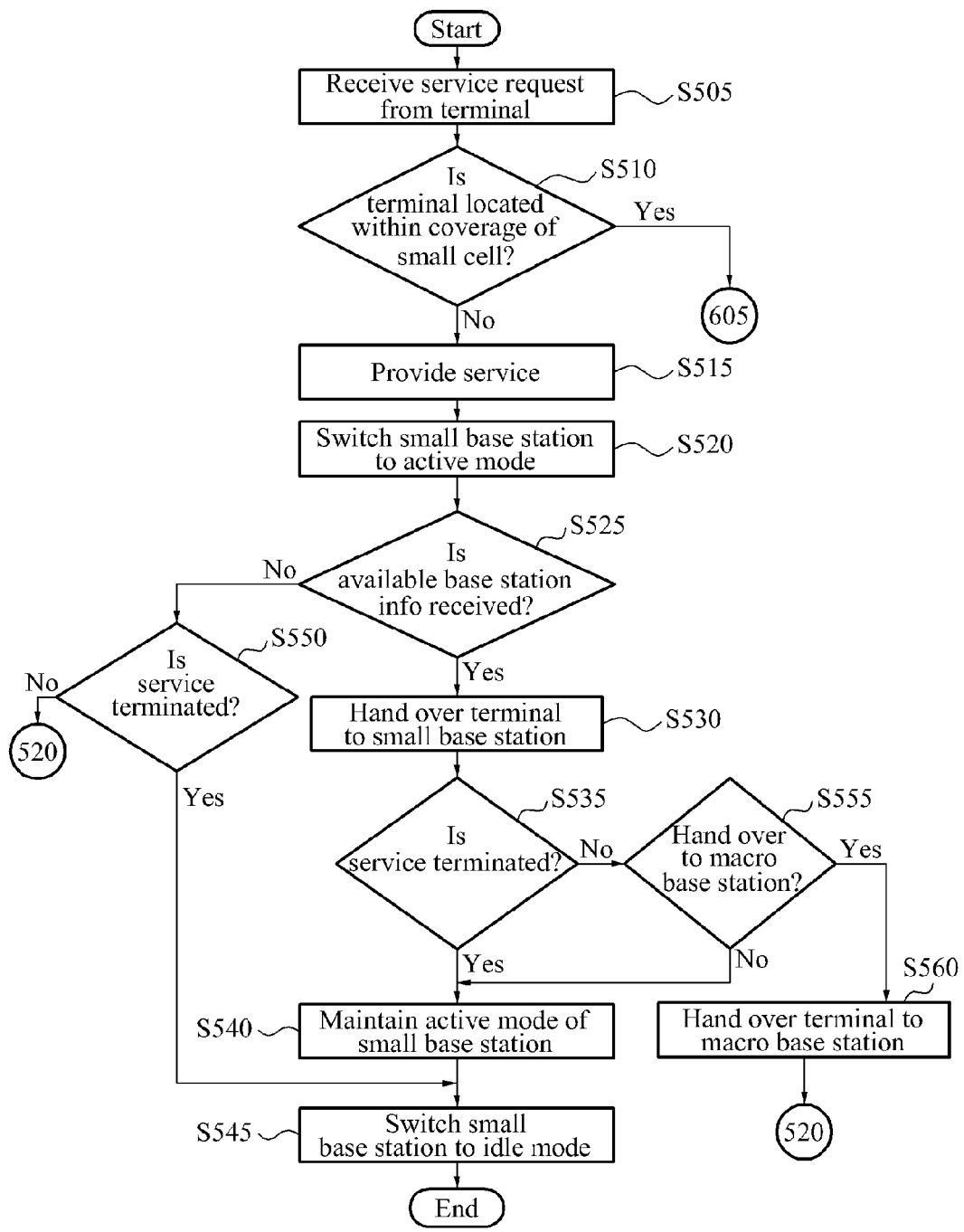
FIG. 5 and FIG. 6 are flowcharts illustrating a method for controlling an operational mode of a small base station by a network controller according to an exemplary embodiment of the present invention.
Figure 6:
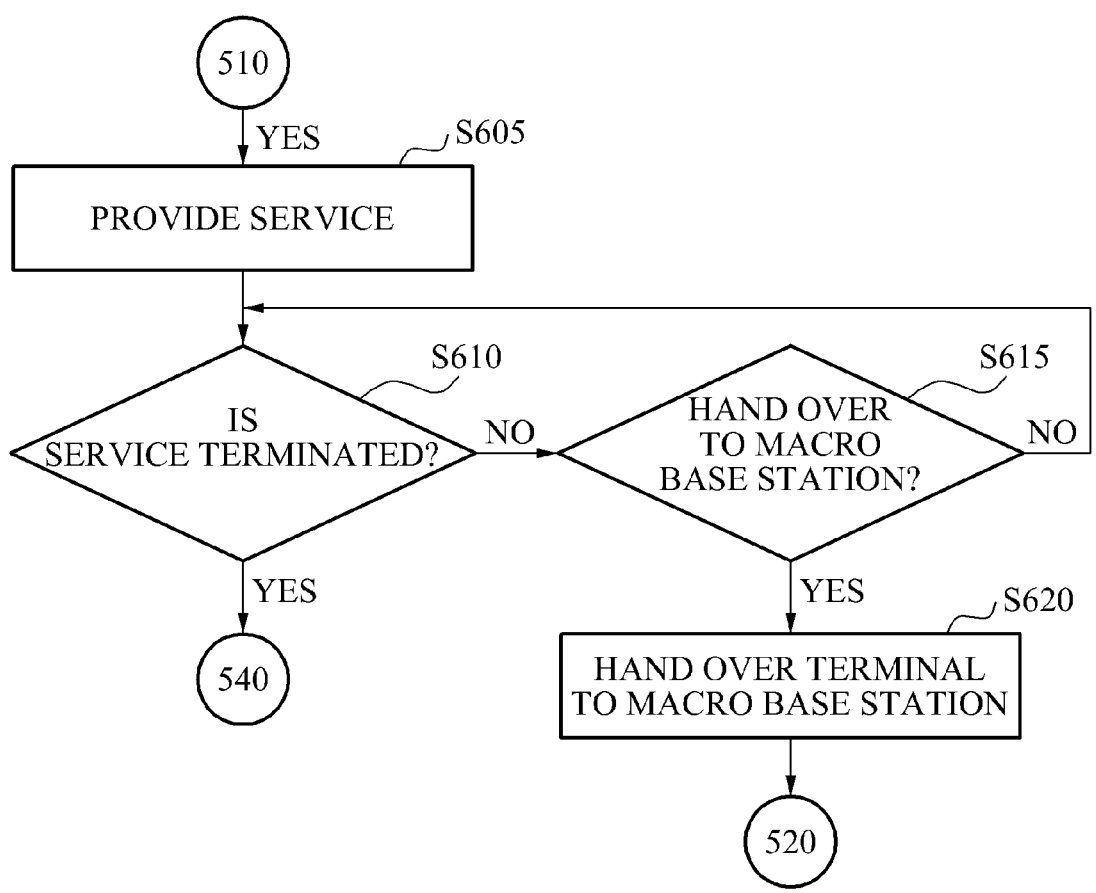

FIG. 5 and FIG. 6 are flowcharts illustrating a method for controlling an operational mode of the base station 200 by the network controller 400 according to an exemplary embodiment of the present invention.

Referring to FIG. 5, if a service request is received from the terminal 300 in operation S505, the network control unit 420 may determine whether the terminal 300 is camped on, i.e., located, within the coverage of a small cell, for example, the small cell FC1 or small cell FC2, in operation S510. The service request may include a case in which a service is requested from the terminal 300 and a case in which the terminal 300 receives data from another device.

If the terminal 300 is not located within the coverage of a small cell, for example, the small cells FC1 and FC2, the network control unit 420 may transmit a command to the macro base station 100 to provide the requested service in operation S515.

In operation S520, while the macro base station 100 provides the service to the terminal 300, the network control unit 420 may switch at least one of the small base stations of small cells, for example, the small cells FC1 and FC2, included in a macro cell MC to an active mode. If a number of small cells is not large enough to cause interference in an RF communication environment of the macro cell in operation S520, the network control unit 420 may perform the following process by switching at least one of the small base stations of the small cells, for example, the small cells FC1 and FC2, to the active mode. The small base stations of the small cells, for example, the small cells FC1 and FC2, may be switched to the active mode simultaneously.

Also, the network control unit 420 may sequentially switch the small base stations of the small cells, for example, the small cells FC1 and FC2, to the active mode as below and thereby reduce the risk a communication problem, such as interference.

The network control unit 420 may switch, to the active mode, a small base station included in one of the small cells, for example, the small base station 200, and may wait for a measurement report of the terminal 300. The measurement report may include a received signal strength indication (RSSI) of the small base station 200 measured by the terminal 300. If the measurement report includes a measurement result of the small base station 200 switched to the active mode, the network control unit 420 may hand over the terminal 300 to the small base station 200.

Conversely, if the measurement report does not include the measurement result, the network control unit 420 may switch the small base station 200 from the active mode to the idle mode, and may switch another small base station included in another small cell to the active mode. Next, the network control unit 420 may determine handover of the terminal 300 to a corresponding small base station based on the measurement report.

Even though all the small base stations included with the coverage of the macro cell MC are switched to the active mode or the idle mode, the measurement report may not include small base station information. In this case, the network control unit 420 may perform the aforementioned process again after a period of time elapses.

If the measurement report includes information associated with the small base station 200 available for communication in operation S525, the network control unit 420 may hand over the terminal 300 from the macro base station 100 to the small base station 200 in operation S530.

If a service is terminated in operation S535, the network control unit 420 may maintain the active mode of the small base station 200 in operation S540.

If a period of time elapses, the network control unit 420 may control the network communication unit 410 to transmit to the small base station 200 a command to switch from the active mode to the idle mode in operation S545. Accordingly, the small base station 200 may be switched from the active mode to the idle mode.

If the terminal 300 reports that the service is terminated in operation S550 while receiving from the terminal 300 the measurement report excluding information associated with the available small base station 200 at least once in operation S525, the network control unit 420 may perform operation S545 and switch the small base station 200 to the idle mode.

If the service is not terminated even after a period of time in operation S550, the network control unit 420 may perform operation S520 or operation S525.

If the service is not terminated after a period of time in operation S535, the network control unit 420 may determine whether to hand over the terminal 300 from the small base station 200 to the macro base station 100 in operation S555.

If the terminal 300 does not receive the service from the small base station 200, the network control unit 420 may hand over the terminal 300 from the small base station 200 to the macro base station 100 in operation S560. If the network control unit 420 determines to not handover in operation S555, the network control unit 420 may perform operation S540 and maintain the small base station 200 in the active mode.

If the terminal 300 is located within the coverage of the small cell, for example, one of the small cells FC1 and FC2, in operation S510, the network control unit 420 may perform operation S605 of FIG. 6. In operation S605, the network control unit 420 may control the small base station 200 to communicate with the terminal 300 and to provide the service.

If the small base station 200 or the terminal 300 reports that the service is terminated in operation S610, the network control unit 420 may perform operation S540 and maintain the small base station 200 in the active mode.

Conversely, if the small base station 200 or the terminal 300 does not report that the service is terminated even after a period of time in operation S610, the network control unit 420 may determine whether to hand over the terminal 300 from the small base station 200 to the macro base station 100 in operation S615.

If the handover is determined to happen, the network control unit 420 may hand over the terminal 300 from the small base station 200 to the macro base station 100 in operation S620. If the network control unit 420 hands over the terminal 300 from the small base station 200 to the macro base station 100 in operation S620, the operation of network control unit 420 may be returned to operation S520 or operation S525.

If the handover is determined to not happen in operation S615, the network control unit 420 may repeat operation S610 to determine whether service is terminated.

Figure 7:
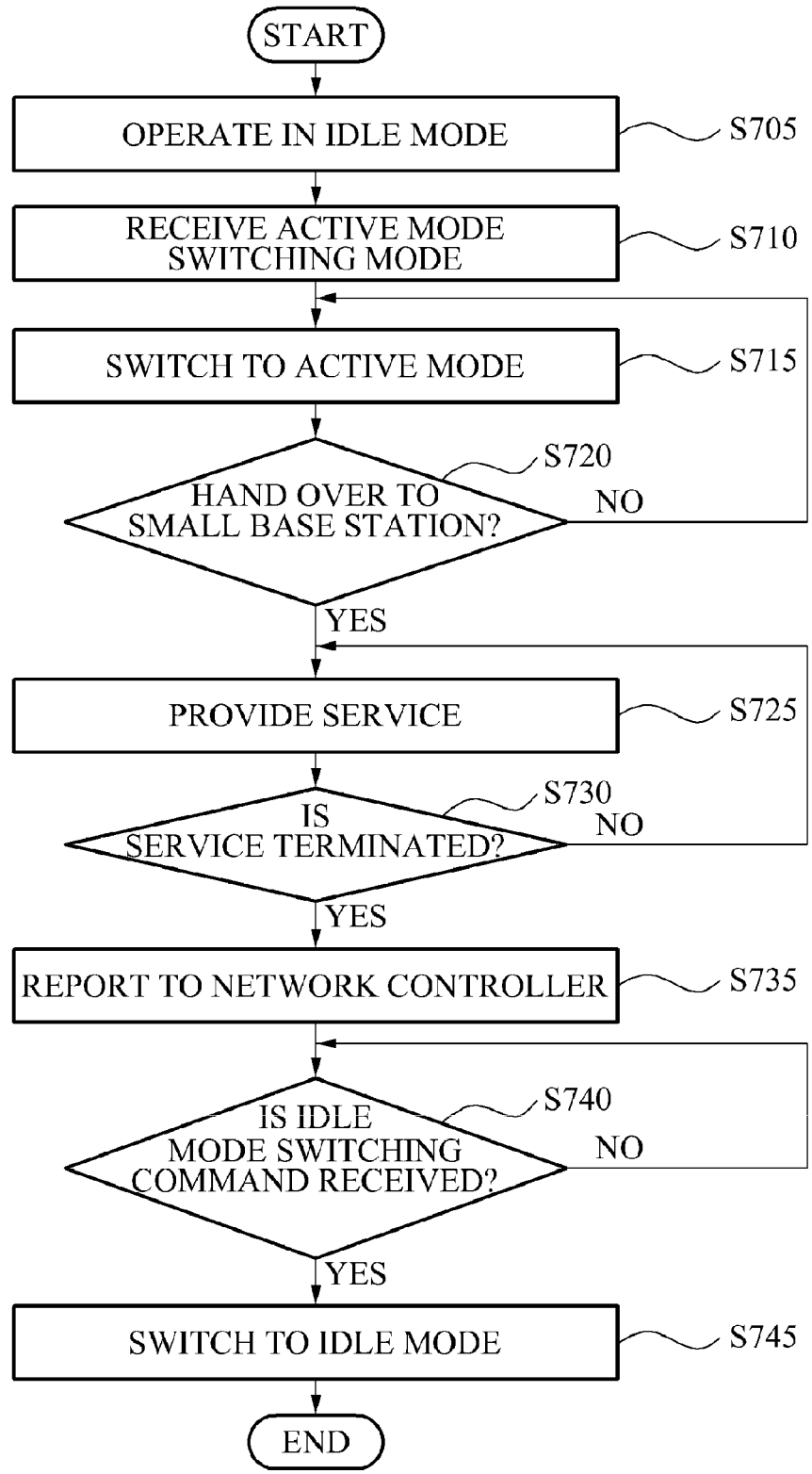
FIG. 7 and FIG. 8 are flowcharts illustrating a method for operating a small base station according to an exemplary embodiment of the present invention.
Figure 8:
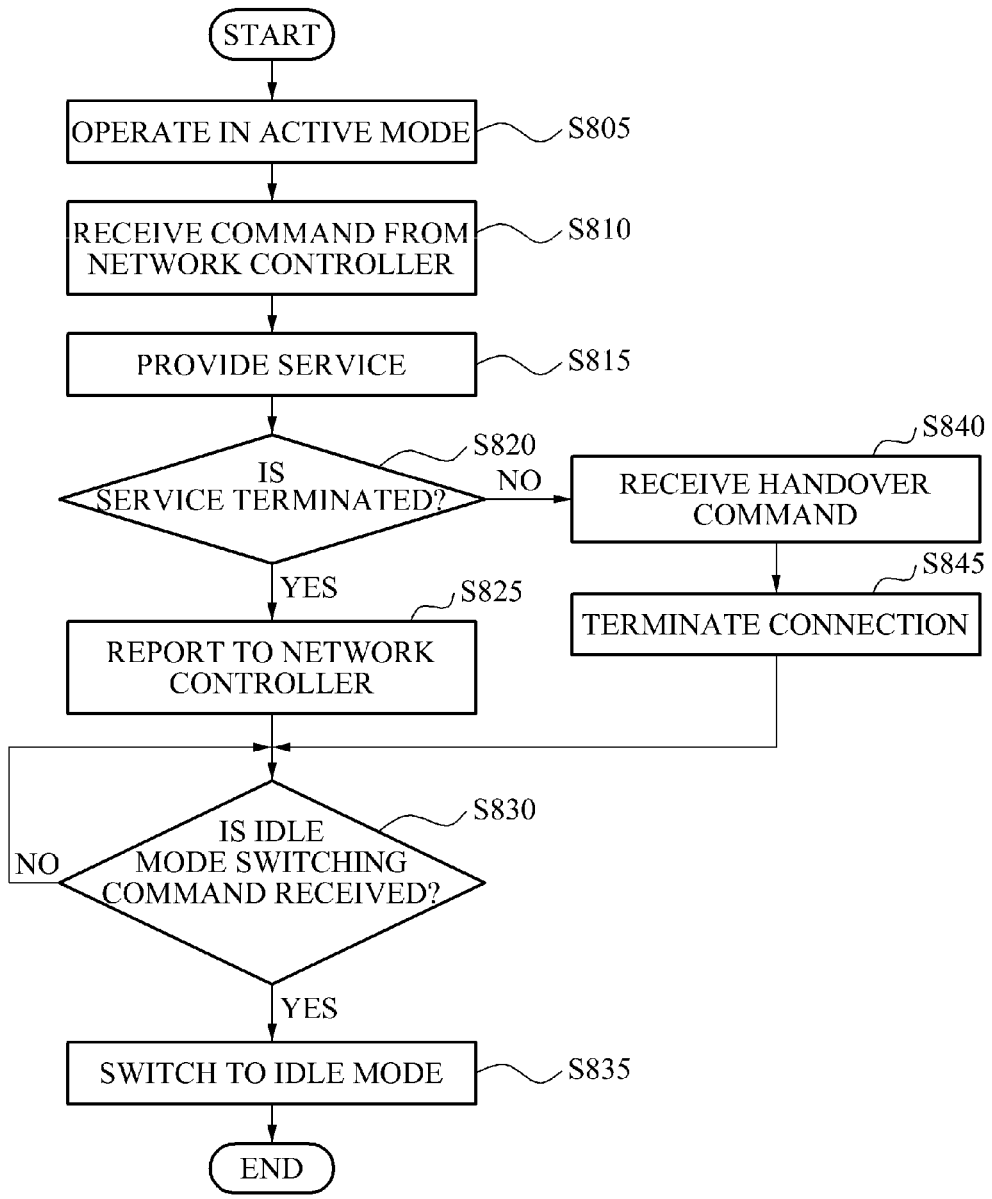

FIG. 7 and FIG. 8 are flowcharts illustrating method for operating the small base station 200 according to exemplary embodiments of the present invention.

Referring to FIG. 7, in operation S705, the small base station 200 may operate in an idle mode.

In operation S710, the small base station communication unit 210 may receive an active mode command from the network controller 400.

In operation S715, the small base station control unit 220 may switch the small base station 200 from the idle mode to an active mode.

If a message indicating that a communication service with the terminal 300 is or is to be handed over to the small base station 200 is received from the network controller 400 in operation S720, the small base station control unit 220 may provide the terminal 300 with the service in operation S725. If no message indicating that a communication service with the terminal 300 is or is to be handed over to the small base station 200 or a message indicating that a communication service with the terminal 300 is not or is not to be handed over to the small base station 200, the small base station 200 may return to operations S715 or S720.

If it is determined that the service is terminated in operation S730, the small base station control unit 220 may report to the network controller 400 about that the service is terminated in operation S735. If it is determined that the service is not terminated in S730, the small base station 200 provides the terminal 300 with the service in operation S725.

If the small base station communication unit 210 receives an idle mode switching command from the network controller 400 in operation S740, the small base station control unit 220 may be switched from the active mode to the idle mode in operation S745.

Referring to FIG. 8, in operation S805, the small base station 200 may operate in an active mode. If the small base station communication unit 210 receives from the network controller 400 a command to communicate with the terminal 300 in operation S810, the small base station control unit 220 may provide the terminal 300 with a service in operation S815.

If it is determined that the service is terminated in operation S820, the small base station control unit 220 may report to the network controller 400 about that the service is terminated in operation S825.

If a handover command is received from the network controller 400 in operation S840 if the service is determined to not be terminated in operation S820, the small base station control unit 220 may terminate a connection with the terminal 300 and thereby terminate the service in operation S845, and then may go to operation S830.

In operation S830, it is determined if the small base station communication unit 210 receives an idle mode command from the network controller 400. If the idle mode command is received in operation S830, the small base station 200 may switch to the idle mode.

This application is also related to U.S. patent application Ser. No. 12/832,621, which is assigned to the same assignee of the present application and was filed on Jul. 8, 2010, and which claims priority from and the benefit of Korean Patent Application No. 10-2009-0098751, filed on Oct. 16, 2009, all of which are hereby incorporated by reference for all purposes as if fully set forth herein.

The exemplary embodiments according to aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media, such as hard disks, floppy disks, and magnetic tape; optical media, such as CD ROM disks and DVD; magneto-optical media, such as floptical disks; and hardware devices that are specially configured to store and perform program instructions, such as read-only memory (ROM), random access memory (RAM), flash memory, and the like; and combinations thereof. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A network controller, comprising:
   a network communication unit to communicate with a macro base station of a macro cell and a small base station of a small cell; and
   a network control unit to control the small base station to be booted up in an idle mode if the small cell is located within a coverage of the macro cell, and to be booted up in an active mode if the small cell is located outside the coverage of the macro cell,
   wherein if the network communication unit receives from the small base station a sensing signal indicating that a communication signal transmitted from the macro base station is sensed, the network control unit determines that the small cell is located within the coverage of the macro cell.

2. The network controller of claim 1, wherein the small base station does not provide a service in the idle mode and provides the service in the active mode.

3. The network controller of claim 1, wherein, if the network communication unit receives information associated with a location of the small base station, the network control unit compares the location of the small base station with the coverage of the macro base station to determine whether the small cell is located within the coverage of the macro cell.

4. The network controller of claim 1, wherein, if a service request associated with a terminal is received by the network communication unit and the terminal is located within a coverage of the small cell, the network control unit controls the small base station to provide the terminal with a service.

5. The network controller of claim 4, wherein, if the service is terminated, the network control unit controls the small base station to switch from the active mode to the idle mode.

6. The network controller of claim 4, wherein the network control unit hands over the terminal to the macro base station before the service is terminated.

7. The network controller of claim 1, wherein if a service request associated with a terminal is received and the terminal is not located within a coverage of the small cell, the network control unit controls the macro base station to provide the terminal with a service.

8. The network controller of claim 7, wherein, while the macro base station provides the service to the terminal, the network control unit controls the network communication unit to transmit to the small base station a command to switch from the idle mode to the active mode.

9. The network controller of claim 8, wherein, if the small base station is switched from the idle mode to the active mode, the network control unit hands over the terminal to the small base station and controls the small base station to provide the terminal with the service.

10. The network controller of claim 9, wherein the network control unit switches the small base station from the active mode to the idle mode.

11. The network controller of claim 9, wherein, if the small base station is switched from the idle mode to the active mode and does not complete providing of the service to the terminal, the network control unit hands over the terminal to the macro base station.

12. A small base station, comprising:
a small base station communication unit to communicate with a macro base station and a network controller; and
a small base station control unit to control the small base station communication unit to report to the network controller that a communication signal transmitted from the macro base station is sensed if the small base station is powered on and the small base station communication unit senses the communication signal, and to control the small base station to operate in one of an idle mode and an active mode according to a command received from the network controller.

13. The small base station of claim 12, wherein the small base station does not provide a service in the idle mode and provides the service in the active mode.

14. The small base station of claim 12, wherein if a command to switch from the idle mode to the active mode is received from the network controller while the small base station control unit operates in the idle mode, the small base station control unit controls the small base station to operate in the active mode.

15. The small base station of claim 12, wherein, in the active mode, the small base station control unit provides a terminal with a service according to a control of the network controller.

16. The small base station of claim 15, wherein, if the service is terminated, the small base station control unit controls the small base station to be switched from the active mode to the idle mode according to the control of the network controller.

17. The small base station of claim 12, wherein, if the macro base station provides the terminal with the service while the small base station operates in the active mode, the small base station control unit controls the small base station to be switched from the active mode to the idle mode in response to an idle mode switching command received from the network controller.

* * * * *